(12) United States Patent
Tzap et al.

(10) Patent No.: US 7,326,765 B1
(45) Date of Patent: Feb. 5, 2008

(54) MELAMINE RING-CONTAINING CO-POLYMERS; METHODS OF MAKING AND USING THE SAME

(75) Inventors: Gregory P. Tzap, Mount Laurel, NJ (US); Perry Springsted, Sewell, NJ (US)

(73) Assignee: Palmer International, Inc., Skippack, PA (US)

( * ) Notice: Subject to any disclaimer, the term of this patent is extended or adjusted under 35 U.S.C. 154(b) by 0 days.

(21) Appl. No.: 10/642,873

(22) Filed: Aug. 18, 2003

Related U.S. Application Data

(60) Provisional application No. 60/404,218, filed on Aug. 16, 2002.

(51) Int. Cl.
*C08G 73/06* (2006.01)

(52) U.S. Cl. ............... 528/423; 528/424; 528/254; 528/256; 525/203; 525/279; 525/540

(58) Field of Classification Search ........... 528/423, 528/424, 254, 256; 525/203, 279, 540
See application file for complete search history.

(56) References Cited

U.S. PATENT DOCUMENTS

| | | | |
|---|---|---|---|
| 2,434,797 A | 1/1948 | Harvey | |
| 2,448,767 A | 6/1948 | Carlson | |
| 2,967,892 A | 1/1961 | Smith | |
| 2,987,555 A | 6/1961 | Davis | |
| 3,046,226 A | 7/1962 | Sandberg et al. | |
| 3,214,406 A | 10/1965 | Sandberg et al. | |
| 3,283,030 A | 11/1966 | Bean, Jr. et al. | |
| 3,644,534 A | 2/1972 | Reabe et al. | |
| 4,310,706 A | 1/1982 | Strege | |
| 5,059,723 A | 10/1991 | Dressler | |
| 5,068,460 A | 11/1991 | Sumner, Jr. et al. | |
| 5,525,201 A | 6/1996 | Diaz-Arauzo et al. | |
| 6,229,054 B1 | 5/2001 | Dai et al. | |

FOREIGN PATENT DOCUMENTS

| | | |
|---|---|---|
| GB | 828496 | 2/1960 |
| GB | 2 262 525 A | 6/1993 |

OTHER PUBLICATIONS

Sawada et al, Melamine resin containing materials for injection molding, 1993, Chem Abstract 119:161751.*
Semina et al, Oxidative film fromation of melamine formaldehyde oligomers, 1990, Chem Abstract 112: 181468.□□.*
Vaszilcsin et al, Alkyl resin solutions for anticorrosive coatings containing melamine resins, 1996, Chem Abstract 124: 205109.*

(Continued)

*Primary Examiner*—Duc Truong
(74) *Attorney, Agent, or Firm*—Flaster/Greenberg P.C.

(57) ABSTRACT

A melamine ring containing copolymer and a method of manufacturing a melamine ring containing copolymer are described. The method includes mixing melamine and cashew nut shell liquid, heating the mixture, and reacting the mixture for about 4 to 6 hours. The melamine ring containing copolymer can have a dynamic viscosity of about $0.5 \times 10^4$ P to about $3 \times 10^4$ P or a viscosity that continues to increase upon heating.

30 Claims, 3 Drawing Sheets

OTHER PUBLICATIONS

Enokida et al, Topcoat compositions for automobiles, 1991, Chem Abstract 115: 258415.*

Pillai et al, Polymeric resins from renewable resources, 1990, Chem Abstract 113: 213128.*

Arthur B. Lamb, et al., Cashew Nut Shell Liquid. II. An Application of the Prevost Reagent to Alkenyl Phenols, Journal of American Chemical Society, vol. LXCIII, Jan.-Jul., 1946, p. 345.

* cited by examiner

MELAMINE RING-CONTAINING CO-POLYMERS; METHODS OF MAKING AND USING THE SAME

CROSS-REFERENCE TO RELATED APPLICATION

This application claims priority pursuant to 35 U.S.C. § 119(e) to U.S. patent application Ser. No. 60/404,218, filed Aug. 16, 2002, the contents of which are incorporated herein by reference.

BACKGROUND OF THE INVENTION

Conventional melamine resins are thermosetting resins, as are urea-formaldehyde resins and phenolic resins. Melamine polymer resins belong to a group of thermosetting resin compounds that are called aminoplasts, and have numerous and versatile applications, including use in both industrial and consumer goods and processes. For example, melamine resins can be formed into fibers or dispersions for use in fireblocking or fireproofing textiles (firefighting garments, coatings on children's wear). They can be formed into durable consumer and industrial objects, such as machine parts or dinnerware. They can be used in paints, varnishes, and to form films on surfaces to alter the wear and/or aesthetic properties of the surfaces.

Melamine resins are more water and heat resistant than most other resins and may exist in the form of low molecular weight water-soluble syrups or high molecular weight insoluble powders dispersible in water. Today, melamine resins are widely used not just for coloring materials but also, for example, as: molding compounds with cellulose, in wood flour and mineral powders as fillers; for laminating adhesives; increasing wet strength of paper; textile treatments; leather processing; and for dinnerware and decorative items.

Butylated melamine resins are formed by incorporating butyl or other alcohols during resin formation, whereupon the —$NHCH_2OH$ groups convert to —$NHCH_2OC_4H_9$. These resins are soluble in paint and enamel solvents and in surface coatings, often in combination with alkyds. They give exceptional curing speed, hardness, wear resistance, and resistance to solvents, soaps, and foods. Also, melamine-acrylic resins are water-soluble and are used for formation of water-based industrial and automotive finishes. They are important in making laminates as well as in the production of numerous commercial and industrial products including, for example, cooking dishes, utensils and containers, electrical appliances, decorative articles and insulators.

Like butylated melamine resins and melamine-acrylic resins, the melamine ring-containing co-polymers of the present invention, prepared by the methods described herein, provide useful compositions for use in a variety of applications.

BRIEF SUMMARY OF THE INVENTION

The invention provides a melamine-ring containing co-polymer and methods of preparing the melamine-ring containing co-polymer. Specifically, the invention provides a melamine ring-containing co-polymer that is the reaction product of a melamine base resin and a reactant compound. The reactant compound includes a functional group that is a hydroxyl group, a carboxyl group, and/or a thiol group.

The co-polymer of the invention may be represented by the general structure (I):

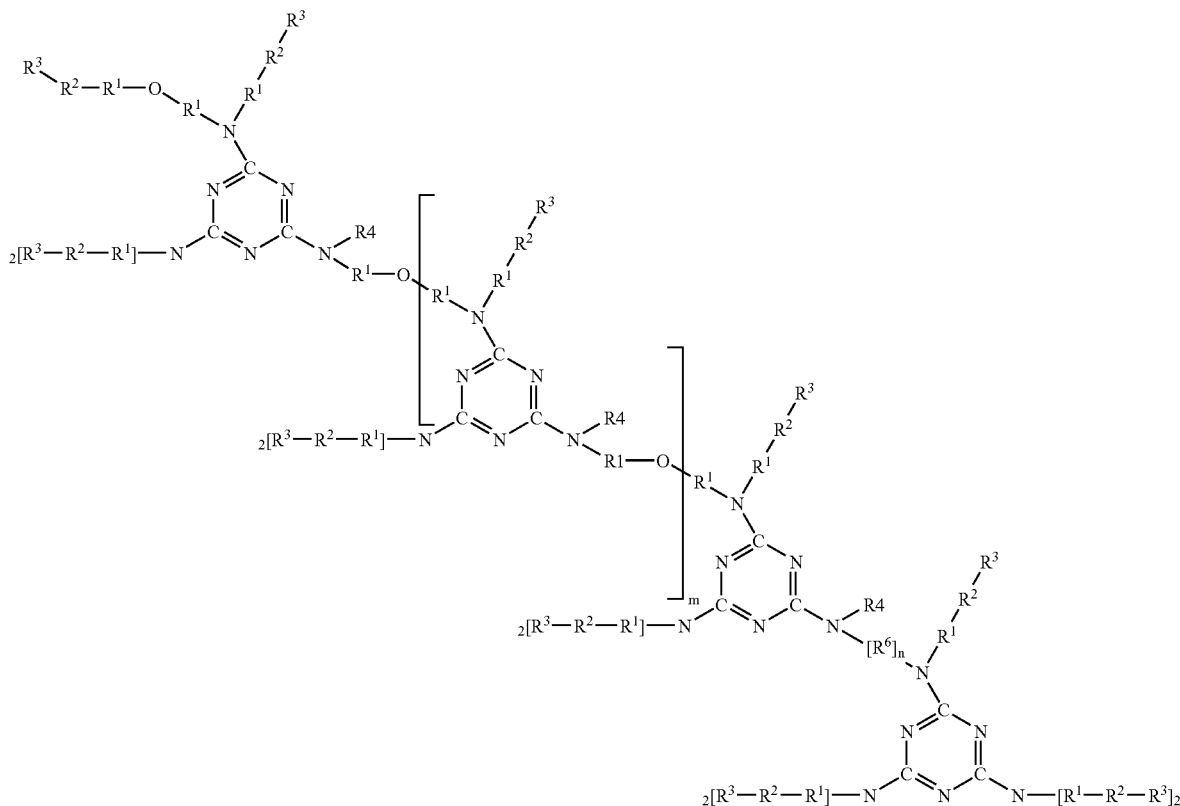

wherein m is an integer of 1 to 100; $R^1$ is independently selected from an alkyl group having one to twenty carbon atoms; $R^2$ is independently selected from the group consisting of an oxygen atom and a sulfur atom; $R^3$ is independently selected from an alkyl group, an allyl group, an alkynyl group, an aryl group, and a phenyl group, having one to seventy carbon atoms; $R^4$ is independently selected from $-C_pH_{2p}OH$; $-C_pH_{2p-1}OH$; $-C_pH_{2p-2}OH$, wherein p is an integer of one to seven; a hydrogen atom; a carboxyl group, an alkyl group; an allyl group; and an alkynyl group; $R^5$ is independently selected from the group consisting of an alkyl group, an alkyl group containing at least one ether linkage, and the group represented by the formula (III):

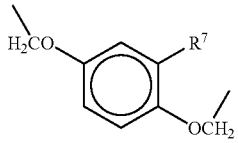
(III)

and; n is an integer of one to thirty.

Also included within the scope of the invention are methods of preparing the co-polymer of the inventions. The methods include reacting a melamine base resin with a reactant compound. The reactant compound contains a functional group that is a carboxyl group, a hydroxyl group, and/or a thiol group, or a combination of these groups.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
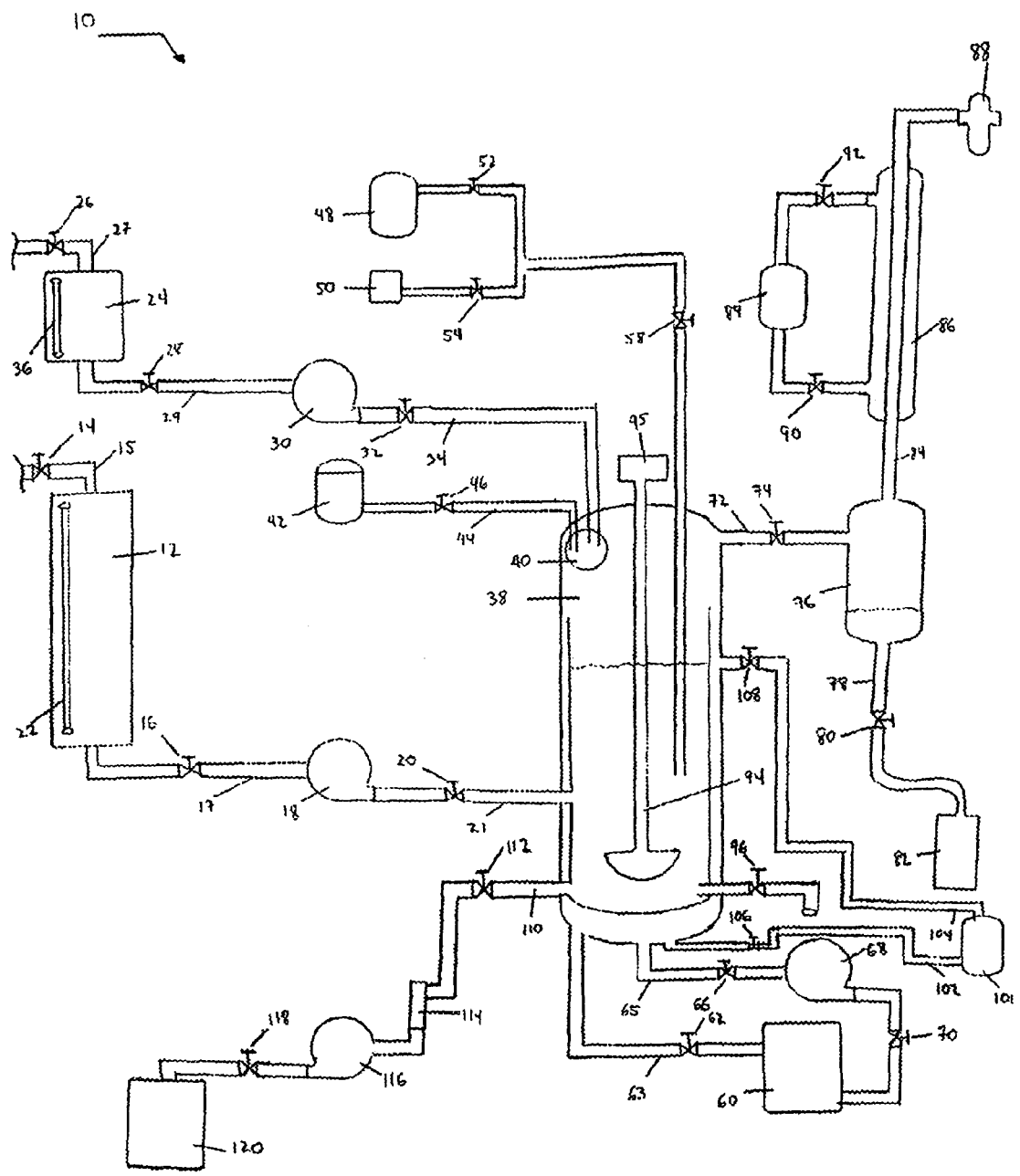
FIG. 1 is a schematic processing diagram illustrating a preferred method of manufacturing the melamine ring-containing co-polymers of the invention.
Figure 2:
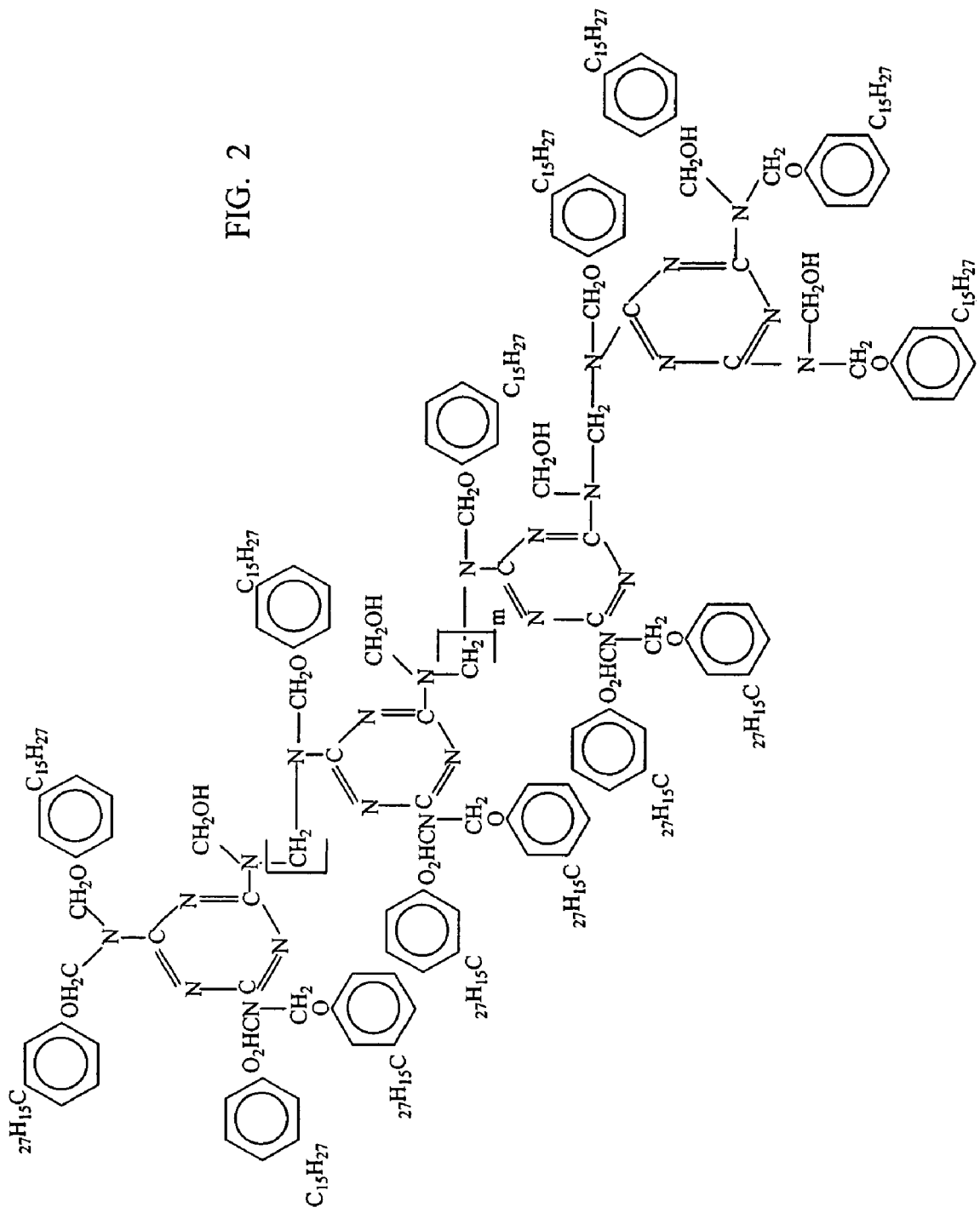
FIG. 2 is a chemical structure representing an embodiment of the melamine-ring containing co-polymer of the invention. "m" in the figure represents an integer of one to five.
Figure 3:
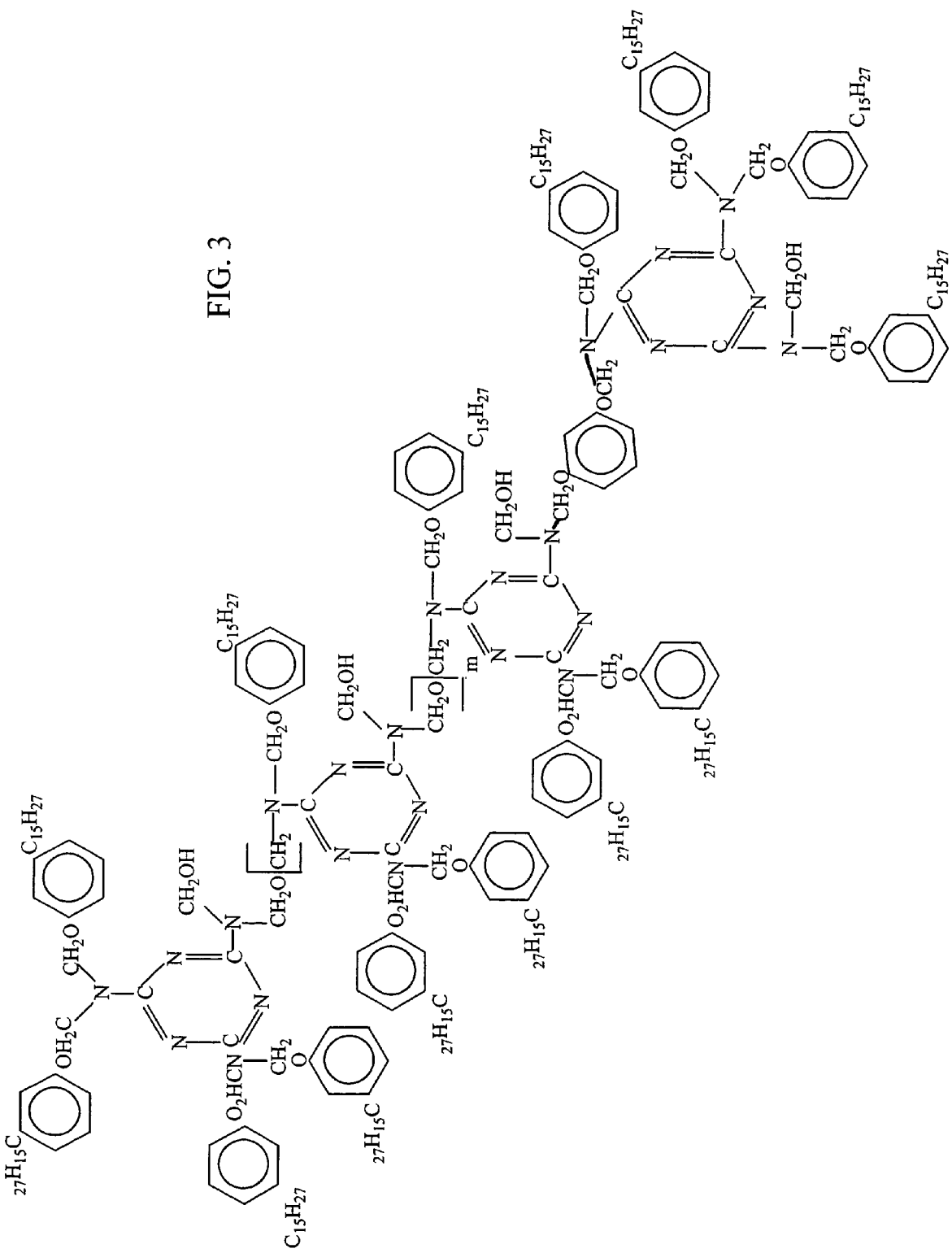
FIG. 3 is a chemical structure representing an embodiment of the melamine-ring containing co-polymer of the invention. "m" in the figure represents an integer of one to five.

The invention provides melamine ring-containing co-polymers that have numerous applications in materials such as household products and appliances including dishes, utensils, dinnerware, furniture, containers, soaps, decorative articles, electrical appliances and foods; industrial and automotive products such as solvents, paints, finishes, coatings, enamels, insulating and molding elements; and numerous other products and product components such as molding and filler compounds, adhesives, paper, textile and leather products, as well as numerous plastic items. The co-polymers of the invention can also be used, for example, as a substitute for, or in combination with, conventional alkyd resins, polyurethane resins, and phenolic resins resulting in final products having, for example, improved gloss, hardness, tack, and adhesion to various substrates.

The invention includes melamine ring-containing co-polymers having a structure represented by the formula (I):

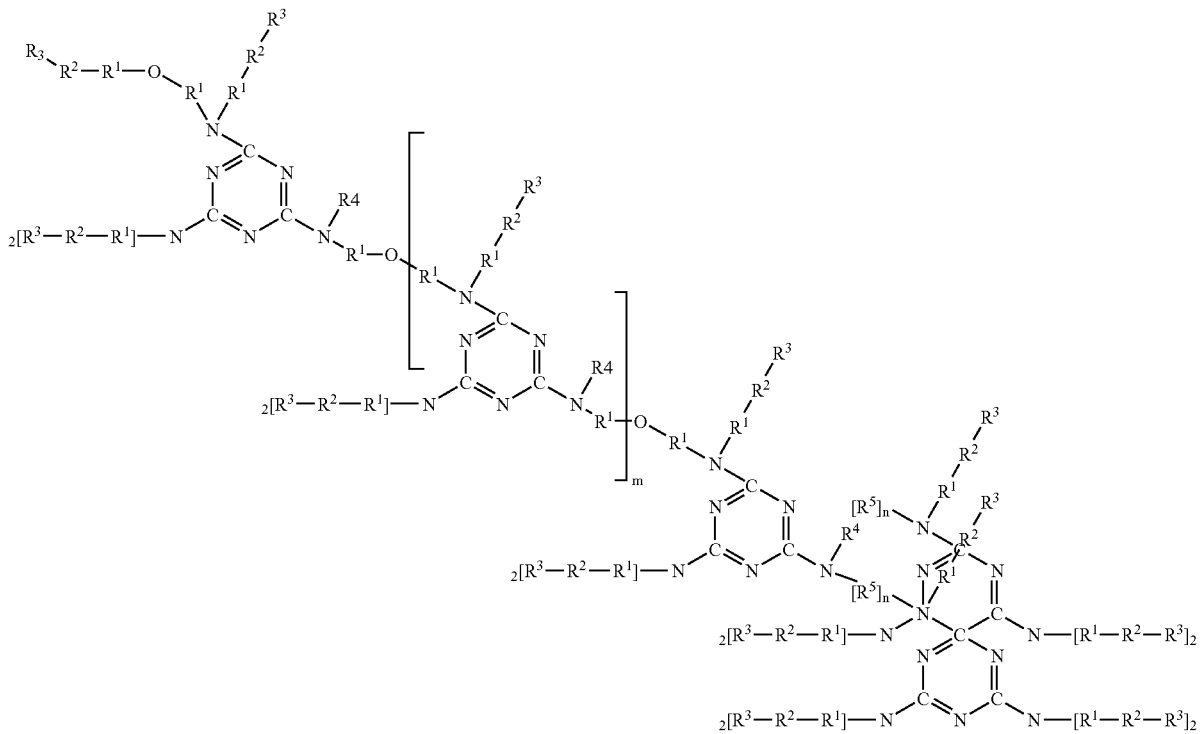
(I)

wherein m is an integer of one to one hundred, preferably an integer of one to thirty, and most preferably an integer of one to five;

$R^1$ is independently selected from an alkyl group, substituted or unsubstituted, branched or unbranched, having one to twenty carbon atoms, preferably having two to seven carbon atoms, and most preferably having one carbon atom;

$R^2$ is independently selected from the group consisting of an oxygen atom and a sulfur atom;

$R^3$ is independently selected from an alkyl group, an allyl group, an alkynyl group, an aryl group, a phenyl group, substituted or unsubstituted, branched or unbranched, having one to seventy carbon atoms, preferably thirty to sixty carbon atoms, and most preferably, six to twelve carbon atoms. In a preferred embodiment, the group $R^3$ is represented by the formula (II):

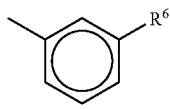

wherein $R^6$ is independently selected from a branched or unbranched, substituted or unsubstituted alkyl group, allyl group, or an alkynyl group of ten to forty carbon atoms, preferably having fifteen to thirty carbon atoms. For example $R^6$ may be the groups represented by the structures:
—(CH$_2$)$_7$CH=CH—(CH$_2$)$_5$CH$_3$
—(CH$_2$)$_7$CH=CHCH$_2$CH=CH(CH$_2$)$_2$CH$_3$;
—(CH$_2$)$_7$CH=CHCH$_2$CH=CHCH$_2$CH=CH$_2$; and
(CH$_2$)$_{14}$CH$_3$, wherein any of the hydrogen atoms may be substituted.

$R^4$ is independently selected from the group consisting of —C$_p$H$_{2p}$OH, —C$_p$H$_{2p-1}$OH, —C$_p$H$_{2p-2}$OH, wherein "p" is an integer of one to seven preferably an integer of one to three; a hydrogen atom a carboxyl group, an alkyl group, an allyl group, and an alkynyl group.

$R^5$ is independently selected from an alkyl group (preferably a methyl group, an ethyl group, a propyl group, or a butyl group), an alkyl group having at least one ether linkage (preferably those having two to seventeen carbon atoms) and a group represented by the formula (III):

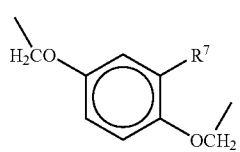

wherein $R^7$ is independently selected from a branched or unbranched, substituted or unsubstituted alkyl group, allyl group, or an alkynyl group of ten to forty carbon atoms, preferably having fifteen to thirty carbon atoms. For example, $R^7$ may be the groups represented by the structures:
—(CH$_2$)$_7$CH=CH—(CH$_2$)$_5$CH$_3$
—(CH$_2$)$_7$CH=CHCH$_2$CH=CH(CH$_2$)$_2$CH$_3$;
—(CH$_2$)$_7$CH=CHCH$_2$CH=CHCH$_2$CH=CH$_2$; and
(CH$_2$)$_{14}$CH$_3$, wherein any of the hydrogen atoms may be substituted. "n" is an integer of one to thirty, preferably three to twenty.

Also contemplated within the scope of the invention are melamine ring-containing co-polymers that are the reaction products of a melamine base resin(s) and a reactant compound(s). The reactant compound includes a functional group that is a hydroxyl group, a carboxyl group, and/or a thiol group. Suitable melamine base resins and reactant compounds are described infra.

The invention also encompasses methods of preparing the melamine ring-containing co-polymer of the invention. The methods include reacting a melamine base resin with a reactant compound that comprises a functional group that is a hydroxyl group (—OH), a carboxyl group (—COOH) or a thiol functional group (—SH). Preferably this reaction is carried out in the presence of a catalyst, or mixture of catalysts.

As used herein "melamine base resin" refers to resins containing a melamine ring structure and derivatives thereof. Suitable "melamine base resins" for use in the methods of the invention include for example, a melamine resin, a melamine-formaldehyde resin, a melamine-urea-formaldehyde resin, and a urea-formaldehyde resin, each of which may be modified or unmodified. By "modified," it is meant that one or more of the hydrogen atoms attached to the carbon atoms in an "unmodified" melamine ring are substituted by a functional group, such as an alkyl group, an allyl group, or an alkoxy group. It is preferred that one or more hydrogen atoms is substituted by a methyl or an ethyl group.

The melamine base resin for use in the method of the invention may be prepared as in known or to be developed in the art, for example, by reaction of urea with formaldehyde, or as described in U.S. Pat. Nos. 6,268,459; 6,252,074; and/or 6,245,909. Additionally, melamine base resins are commercially available, for example, from Cytec Industries, Inc., West Patterson, N.J., U.S.A., sold under the trademark CYMEL®, such as CYMEL® 303 (melamine-formaldehyde resin), MELURAC® (melamine-urea-formaldehyde resins), and/or URAC® (urea-formaldehyde resins).

While one practicing the invention may use any melamine base resin that has the properties described above, it is preferred that the selected melamine base resin contains approximately 50% to 100% of melamine monomers, such as, for example, the monomers hexamethoxymethylmelamine or kis[penta(methoxymethyl)-hydroxymethyl]melamine, or kis[penta(methoxymethyl)-yl]melamine.

The melamine base resin or resins used in the method of the invention may also contain minor amounts of free formaldehyde and/or free urea. For example, free urea or free formaldehyde may be present in a selected melamine base resin in an amount of about 1% to about 20% by total weight, preferably from about 2% to about 7% by weight of the melamine base resin.

In the practice of the method of the invention, the selected melamine base resin or resins (as a combination of resins may be used) is reacted with a reactant compound that has a functional group that is a hydroxyl group, a carboxyl group, or a thiol group. The reactant compound may have only one of these functional groups, or it may have several of these functional groups, each of which may be the same as the others or different.

The remaining structure of the reactant compound to which the functional group(s) are attached may be any organic structure known or to be developed in the art, such as any substituted or unsubstituted, linear, branched or aromatic hydrocarbon known or to be develop in the art, as long as it contains at least one of the above-defined functional groups, and the functional group is not hindered from reacting with the reactive portion of the selected melamine resin.

Exemplary reactant compounds for use in the invention include, for example, alcohols; such as those of the formula $C_nH_{n-1}OH$ where n is an integer of 10 to 50; polyols, such as pentaerythritol, glycerine, ethylene glycol, propylene glycol, trimethylolethane, and trimethylolpropane; fatty acids; such as lauric acid, myristic acid, palmitic acid, stearic acid, arachidic acid, palmitoleic acid, oleic acid, ricinoleic acid, linoleic acid, and arachidonic acid; cardanol (e.g., 3-pendadecenyl phenol); cardol (e.g., 5-pentadecadienyl 8', 11'resorcinol); dodecyl mercaptan; phenyl mercaptan; lauryl thioglycolate; and octyl thioglycolate.

If desired, the method of the invention may be accomplished by combining the melamine base resin(s) with a material that contains one or more reactant compounds, rather than a pure solution of the reactant compound, as long as any additional compound(s) present do not substantially impede the progress of the reaction. For example, the method may comprise combining a selected melamine base resin with a material derived from a plant sap, a vegetable oil, rosins, and/or an animal fat, each of which contains one or more of the reactant compounds described above. The material may contain the reactant compound naturally, or may be modified by known processes in the art to contain the reactant compound.

Vegetable oils that may be used in the method of the invention include, but are not limited to castor bean oil, walnut oil, peanut oil, rapseed oil, palm oil, avocado oil, cottonseed oil, olive oil, palm kernel oil, coconut oil, soybean oil, sunflower oil, safflower oil, linseed oil, corn oil, almond oil, anise seed oil, beech nut oil, borage seed oil, candle nut oil, sesame seed oil, and tung nut oil.

Plant saps that contain or can be treated so that they contain a reactant compound suitable for use in the invention include poison ivy resin, cashew nut shell liquid ("CNSL") and Japanese lac tree resin. CNSL or a distillate of CNSL is most preferred, as it contains the reactant compounds cardanol and cardol. A CNSL distillate is available from Palmer International, Inc., Skippack, Pa., and is assigned the CAS No. 8007-24-7 (trade name 1500-1 CNSL distillate).

In general, if a CNSL distillate is used, it is preferred that the distillate contain about 80% to about 100% by weight of cardanol, more preferably about 85% to about 90% cardanol by weight, and most preferably about 96% to about 98% by weight cardanol. The distillate preferably conatins cardol in an amount of about 1% to about 20% by weight, more preferably about 1% to about 15%, and most preferably about 2% to about 4% by weight.

As is known to a person of skill in the art, the specific isomers of cardol and cardanol present in a given sample of CNSL or CNSL distillate will vary, depending on, for example, the conditions under which the cashew nut trees were cultivated (sun, soil, moisture, etc.) and the process parameters applied in any distillation or other processing. In general, any isomers are acceptable, as long as they retain the functional groups. However, it is preferred that the cardanol present in the CNSL or CNSL distillate has the structure represented by formula (IV):

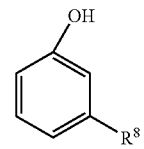

(IV)

wherein the group represented by $R^8$ is one of —$(CH_2)_7CH=CH$—$(CH_2)_5CH_3$; —$(CH_2)_7$ $CH=CHCH_2CH=CH(CH_2)_2CH_3$; —$(CH_2)_7$ $CH=CHCH_2CH=CHCH_2CH=CH_2$; and —$(CH_2)_{14}CH_2$. It is preferred that the cardol present in the CNSL or CNSL distillate has the structure represented by formula (V):

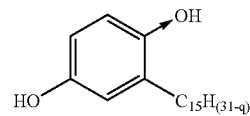

(V)

Regardless of the specific structures present in the CNSL distillate, it is desirable that the equivalent weight of the components of the preferred CNSL distillate, based on phenolic hydroxyl functionality, should be about 250 to about 400, and the average degree of unsaturation on a side chain(s) is about one to about three.

If desired, one may combine the base melamine resin and the reactant product in the presence of a catalyst to facilitate or enhance the progress of polymerization that results in the melamine ring-containing co-polymer of formula (I). For example, the reaction can be carried out in the presence of any proton-donating catalyst known or to be developed in the art, such as, for example, a sulfo radical containing catalyst, such as para-toluene sulfonic acid. Catalysts of this type commercially-available from, for example, Cytec Industries, Inc., West Patterson, N.J., under the trademark CYCAT®. Preferably, the reactions are carried out using a catalyst sold under the trademark CYCAT® 4040, available from Cytec Industries, Inc. According to information provided by the manufacturer, CYCAT® 4040 is a 40% solution of para-toluene-sulfonic acid (ptsa) (CAS No. 000104-15-7) diluted with isopropanol alcohol (CAS No. 000067-63-0) (60% by weight).

However, the catalyst can be any proton-donating catalyst known or to be developed in the art, such as, for example, methanesulfonic acid, phosphoric acid, nitric acid, oxalic acid, maleic acid, hexamic acid, phthalic acid, acrylic acid, para-toluene sulfonic acid, dinonyl naphthalene sulfonic acid, magnesium bromide, zinc nitrate, aluminum nitrate, and/or magnesium nitrate.

The melamine ring-containing co-polymers disclosed here are produced by reacting a melamine base resin and a reactant compound comprising a functional group that is a hydroxyl group, a thiol group, and a carboxyl group. Preferably, the method of manufacture includes combining the melamine base resin and the reactant compound and heating the mixture to a reaction temperature from about 140° C. to about 170° C. Most preferably, the melamine base resin and the reactant compound are combined in the presence of at least one of the catalysts described supra.

The melamine ring-containing co-polymer described herein can be prepared by procedure known or developed in the art. However, referring to the drawings, wherein like reference numerals are used to indicate like elements throughout, there is shown in FIG. 1 a general industrial processing diagram 10 of a preferred method of production or manufacture of a melamine ring-containing polymer of the present invention.

A holding or storage tank or drum 12 contains a base melamine resin ("BMR"). The holding tank 12 is capable of receiving BMR from a source (not shown) by opening inlet valve 14 and allowing BMR to pass through a inlet pipe 15. BMR is discharged from the holding tank 12 by either gravity feed or through an outlet valve 16 to an outlet pipe 17 and then to a first pump 18 before passing through a pump outlet valve 20 and a feed pipe 21. Preferably, the first pump 18 is a metering, centrifugal pump. However, it will be recognized by those of ordinary skill in the art from this disclosure that other types of metering pumps could be used, if desired. Also, the holding tank 12 should be designed to have a sufficient capacity, the volume of which is determined from a tank level indictor 22.

A second holding or storage tank or drum 24 contains a reactant compound comprising a hydroxyl, thiol, or carboxyl functional group ("RC"). The second holding tank or drum 24, which is preferably a 55-gallon type drum, is either delivered to the industrial processing location 10 as needed or is capable of receiving RC from a source (not shown) by opening second inlet valve 26 and allowing RC to pass through a second inlet pipe 27. RC is discharged from the second holding tank or drum 24 by either by gravity feed or through a second outlet valve 28 to a second outlet pipe 29 and then to a second pump 30 before passing through a second pump outlet valve 32 and a second feed pipe 34. Preferably, the second pump 30 is a hand pump. However, it will be recognized by those of ordinary skill in the art from this disclosure that other types of pumps could be used, including centrifugal-type pumps if desired. Also, if necessary, the second holding tank 24 contains a second tank level indictor 36 for determining the volume in the second holding tank 24.

The feed pipes 21, 34 enter a reactor 38 at different locations but at, preferably, the same time during a loading process. Preferably, the reactor 38 is a batch reactor. However, it will be recognized by those of ordinary skill in the art from this disclosure that other types of reactor chambers could be used, if desired. If necessary or desired, either or both of BMR and RC can be loaded into the reactor 38 by removing a manhole cover 40 located at or near the top of the reactor 38 and feeding the reactants into the reactor 38. Preferably, the reaction process also includes the use of a catalyst which is added to the reactor 38 by removing the manhole cover 40 in order to load the catalyst from a catalyst container 42, which is preferably a five-gallon pail, through a catalyst feed line 44 and a catalyst feed valve 46.

For safety and other reasons, if is preferred that oxygen is substantially, if not completely, removed from the reactor 38 prior to BMR and RC. In order to accomplish this, an inert gas, preferably nitrogen, is provided in a gas tank 48 or produced by a generator 50, both of which are capable of being a source for supplying gas through a gas tank outlet valve 52, when the gas tank is used as the source of the inert gas, or a generator outlet valve 54, when the generator 50 is used as the source of the inert gas, to a gas line 56 and then to a gas feed valve 58. It is preferred that, during a batch reaction process, an inert gas sparge is applied and a temperature of below about 160° C. (about 320° F.) is maintained to prevent oxidation from significantly impacting the viscosity of the final polymer product.

The entire loading process can be, and is preferably, carried out at room temperature (about 20° C.). After the loading process is complete, heat is applied to the reactor 38 to a temperature no greater than about 140° C. to about 170° C. (about 284° F. to about 338° F.) by a heat source 60, which is preferably a boiler. However, it will be recognized by those of ordinary skill in the art from this disclosure that other types of heat sources could be used.

A heat transfer fluid, preferably steam, from the heat source 60 is capable of passing from the heat source 60 through a heat source outlet valve 62 and heat source outlet pipe 63 to an outer shell or blanket 64 of the reactor 38. The transfer fluid is allowed to condense in the outer shell 64 and discharges through a transfer fluid pipe 65 and a transfer fluid pump inlet valve 66 to a transfer fluid pump 68 before passing through a transfer fluid pump outlet valve 70 and returning to the heat source 60. The temperature of the transfer fluid is determined prior to entering and after discharging from the outer shell 64 by placing thermocouples (not shown) in the heat source outlet pipe 63 and the transfer fluid pipe 65, respectively.

For environmental and safety reasons, methanol vapors which evaporate from one or more of the reactants at about 116° C. (about 240° F.), are collected by passing from the reactor 38 through a methanol discharge pipe 72 and methanol discharge valve 74 to a methanol condenser 76 where the methanol is condensed to a liquid form. Preferably, the condenser 76 is a gravity-type decanter. However, it will be recognized by those of ordinary skill in the art from this disclosure that other types of condensers could be used.

The liquid methanol is removed from the methanol condenser 76 by passing through a condenser discharge pipe 78, which is preferably a flexible hose, and a condenser discharge valve 80 to a methanol waste tank or drum 82. Also connected to the methanol condenser 76 is a pollution control discharge pipe 84 which passes through a pollution control condenser 86, which is preferably a water-cooled, shell-and-tube jacket condenser, and is connected to a pollution control device 88. However, it will be recognized by those of ordinary skill in the art from this disclosure that other types of pollution control devices could be used. The pollution control condenser 86, which is connected to a chiller 89 by a pollution control condenser inlet pipe 90 and a pollution control condenser outlet pipe 92, functions to condense methanol and possibly other pollutants and return pollutants to the methanol condenser 76 where they are discharged to the methanol waste tank 82.

The process can be monitored by any method known in the art, including taking samples over time and analyzing the viscosity of the samples. An agitator 94, which is connected to a variable speed motor assembly 95, is contained inside the reactor 38 to mix the reactants and reactant product as viscosity increases. In general, a sample or samples are taken when the process is at about 138° C. to about 149° C. (about 280° F. to about 300° F.) by opening a sample valve 96 and allowing a portion of the reactants to discharge from the reactor 38 through a sample pipe 98. If viscosity is being used as an indicator of the progress of the reaction, samples are taken until the desired viscosity is reached. Viscosity can be measured by any empirical method or protocol known or to be developed in the art, such as, for example, by a Brookfield viscometer (not shown) or a Krebs-Stormer viscometer (not shown).

Upon completion of the reaction, the reaction products are cooled by circulating a coolant through the outer shell 64 of the reactor 38 or by permanently installed internal cooling coils (not shown) inside the outer shell 64 of the reactor 38. The coolant, which is preferably water, can be circulated through the outer shell 64 and an outer shell chiller 100 which are connected by a chiller inlet pipe 102 and a chiller outlet pipe 104. The chiller inlet pipe 102 and a chiller outlet pipe 104 contain a chiller inlet valve 106 and a chiller outlet valve 108 which isolate the outer shell chiller 100 from the outer shell 64.

The final product may be cooled to about 116° C. or less (about 240° F. or less). The product is then collected by pumping it through a reactor discharge pipe 110, which is preferably a flexible hose, and a reactor discharge valve 112 before passing through a filter 114, a discharge pump 116, and a discharge pump outlet valve 118 before collecting, ultimately, in a final product tank 120, which is preferably a drum or tote. Preferably, the filter. However, it will be recognized by those of ordinary skill in the art from this disclosure that other types of filters could be used. Also, preferably, the discharge pump 116 is a centrifugal pump. However, other types of pumps could be used, if desired.

After being contained in the final product tank 120, the melamine ring-containing polymer is then cooled to about 60° C. or below (about 140° F.). If desired, analysis can be performed on the melamine ring-containing co-polymer to determine its final properties.

The resultant melamine ring-containing co-polymers are a liquid or semi-solid resin that contains little or no hazardous solvents. If desired, the co-polymers can be blended with other resins, polymers or co-polymers known in the art to lower its volatile organic compounds (VOCs). Additionally, one may wish to mix the co-polymer with any of various solvents as known in the art. Suitable solvents include aromatic and/or aliphatic solvents, such as mineral spirits, xylene, petroleum ethers, petroleum spirits, and VM&P naphtha.

The melamine ring-containing co-polymers of the present invention preferably exhibit the following properties: a dynamic viscosity of about $0.5 \times 10^4$ P to about $3 \times 10^4$ P as measured using a Brookfield viscometer (Model RVF, No. 7 spindle at 2 r.p.m.); a weight per gallon of about 8-9 pounds/gallon; a value of no greater than 15 in a Garden-Holt test; and non-volatiles of about 99% as measured at 110° C. (230° F.) for about one hour. However, it will be understood by a person of skill in the art that the melamine ring-containing polymer resins of the present invention can have different properties without departing from the spirit and scope of the present invention.

The co-polymers of the invention are useful in applications which utilize conventional melamine resins, including, but not limited to, use as an additive in inks to improve, for example, drying properties to increase tack; use as additives for clear coats, such as finishes and varnishes for furniture, floors, or other surfaces; use as additives in paints (as, for example, a binder); and use in adhesives where, for example, the resins can be used as a substitute for, or in conjunction with, conventional adhesive ingredients, such as coumarone-indene, polyamides, rosin ester, and/or hydrocarbon resins, for example. Further, the co-polymers of the invention are highly stable as compared to conventional resins and they do not dry until metallic dryers or an air dry vehicle is added, making them more amenable to various processes.

Additionally, the co-polymers of the invention can be formed into films or coatings. These films and coatings exhibit desirable properties, such as excellent hardness, good water resistance, excellent methyl ethyl ketone (MEK) resistance, and high gloss. The melamine ring-containing co-polymers of the invention can be applied to surfaces to form films or coatings by any means know in the art, including painting extruding or spraying.

Additionally, the polymers of the invention can be incorporated into various compositions for use in inks, finishes, varnishes, household and industrial paints, surface treatments for metal, wood, plastic, rubber, or stone surfaces, and can be used in a method to improve the properties of such compositions.

The invention also encompasses articles and surfaces to which the polymer or a composition containing the polymer has been applied.

EXAMPLES

The invention will now be described in further detail with respect to the following examples. The examples are only illustrative examples and are not intended to be considered as limitations of this invention.

Example 1

A melamine ring-containing co-polymer of the invention was prepared. A 100 ml reaction kettle was charged with a (i) modified melamine-formaldehyde resin, sold under the trademark CYMEL® 303, (ii) a CNSL distillate sold under the trade name 1500-1 CNSL by Palmer International, Inc., Skippack, Pa., and (iii) CYCAT®4040, a catalyst that is 40% by weight para-toluene sulfonic acid and 60% by weight isopropanol, in the following amounts (Table I):

TABLE I

| Component | Amount |
| --- | --- |
| modified melamine-formaldehyde resin | 29.01 wt % |
| CNSL distillate | 70.46 wt % |
| Catalyst (CYCAT ® 4040) | |
| isopropanol | 0.32 wt % |
| para-toluene sulfonic acid | 0.26 wt % |
| Total | 100.00 |

Under a nitrogen sparge and using gentle agitation to avoid foaming, the mixture was heated to about 160° C. (about 320° F.). When the mixture reached approximately 113° C. (about 235° F.), it was observed that the methanol began to vaporize. It was determined that approximately 15.62 ml of methanol was generated from the reaction. The reaction mixture was maintained at about 160° C. (about 320° F.), until analysis of sample using a Brookfield viscometer (Model RVF, No. 7 spindle, at 2 r.p.m.) was completed. The sample result indicated that the viscosity of the resin was approximately 1,500,000 centipoise. The melamine ring-containing co-polymer was then cooled and poured through a strainer. The entire process was completed in about four hours and resulted in a 87.3% yield.

As illustrated by this example, the method of producing a melamine ring-containing co-polymer of the invention is an improvement over other methods for producing conventional synthetic resins in the co-polymer of the invention can be prepared in less than half the time and at a lower process temperature compared to the manufacture of conventional synthetic resins. While the manufacture of conventional resins typically requires eight to fourteen hours of process time at a temperature of about 182° C. to about 249° C. (about 360° F. to about 480° F.), the co-polymers produced by the method described above can be manufactured to a yield of about 80% to about 90% in about four to six hours, at process temperatures less than about 140° C. to about 170° C. (about 284° F. to about 338° F.). Accordingly, the method of manufacture of the invention provides reduced manufacturing and energy costs relative to the production of other melamine ring-containing polymers described in the art.

Example 2

A set of experiments was conducted using the apparatus and methods of manufacture previously described to demonstrate that variations in the end properties of the co-polymer can be achieved through minor variations in the amount and or type of reactant compounds used. The experiments involved reacting 1 equivalent of various CNSL distillates (having differing cardol contents) with 1 equivalent of the base melamine resin CYMEL® 303. In a first experiment, reacting a CNSL containing about 4% cardol with CYMEL® 303 produced a somewhat fluid resin. However, when a CNSL containing about 8% cardol was reacted with CYMEL® 303, the viscosity of the co-polymer resin significantly increased by the time the theoretical amount of byproduct was collected. Next, raw CNSL which typically contains about 15% cardol was reached with CYMEL® 303 and produced a material that gelled just prior to collecting the theoretical amount of byproduct. Finally, it was noted that the reaction of CNSL distillation residue, which contains about 20-25% cardol and CYMEL® 303 produced a gelled co-polymer resin product in the early stages of the reaction.

From the results described above, it is hypothesized that as cardol content increases, the degree of polymerization of the final co-polymer resin is increased. Also, the greater percentage of cardol present in the reaction mixture, the greater the viscosity, such that the viscosity increases to a point of gelation. Although the majority of these reactions deal with cardanol and chain termination, the polymerization reaction between cardol's two phenolic hydroxyl and CYMEL® 303 appears to occur at a more rapid rate and have a great impact on the rheological properties of the phenolic melamine resin of the invention. Thus, the viscosity of the final co-polymer can be varied by the method of manufacture previously described.

Example 3

A second set of experiments was conducted which involved altering the ratio of the reactants. For this set of experiments, CYMEL® 303 was selected as the melamine base resin. A CNSL distillate containing about 4% cardol was also used.

In the first experiment one equivalent of the CNSL distillate was reacted with one equivalent of CYMEL®303. The resultant product ("the 1/1 resin") contained an excess amount of cardanol. Thermogravimetric analysis (TGA) of the product indicated that a low molecular weight fraction was "fuming off." Also, a ° C. (500° F.) oven test was carried out on the 1/1 resin. Since it is known that, if cardanol is not fully reacted in the product at 260° C. (500° F.), then smoke will be observed from the product. In order to accomplish this test, a 5-gram sample of the 1/1 resin was placed into an oven heated to 260° C. (500° F.) for approximately 5-10 minutes during which heavy smoke was observed.

In contrast, when 0.8 equivalents of the CNSL distillate was reacted with 1 equivalent CYMEL® 303, the product ("the 0.8/1 resin") was noticeably different. The viscosity of the 0.8/1 resin was greater than the viscosity of the 1/1 resin previously-described. It is believed that this difference is attributable to less chain termination reactions in the 0.8/1 resin and also less free cardanol to act as a diluent during the reaction.

Further, the TGA result of the 0.8/1 resin showed less thermal degradation relative to the 1/1 resin. Further, when the 260° C. (500° F.) oven test was carried out using the 0.8/1 resin, considerably less smoke was observed during the test in comparison to the heavy smoke observed when the 1/1 resin was heated. Thus, it is believed that, although the theoretical amount of byproduct was the same in both reactions, free, unrelated cardanol remains in each resin, although in differing amounts.

When approximately 0.6 equivalents of the CNSL distillate are reacted with an excess amount of CYMEL® 303, the resin produced a semi-solid. This product exhibited good thermal stability as shown by its TGA result. Also, the product did not generate smoke when placed in a 260° C. (500° F.) oven and the theoretical amount of byproduct produced was nearly the same as the first experiment.

Without intending to be held to the theories set forth herein, it is believed that several conclusions about the melamine ring-containing polymer resins of the invention and the process for making the same can be made based upon the above-identified Examples and experiments contained therein. First, it was observed that if the co-polymer resin product is heated after the byproduct stops vaporizing, the viscosity of the polymer resin will continue to increase. It is believed that this occurs because the CNSL distillate is capable of polymerizing "through" the unsaturated sites found on the cardol/cardanol side chain.

We claim:

1. A melamine ring-containing co-polymer of formula (I)

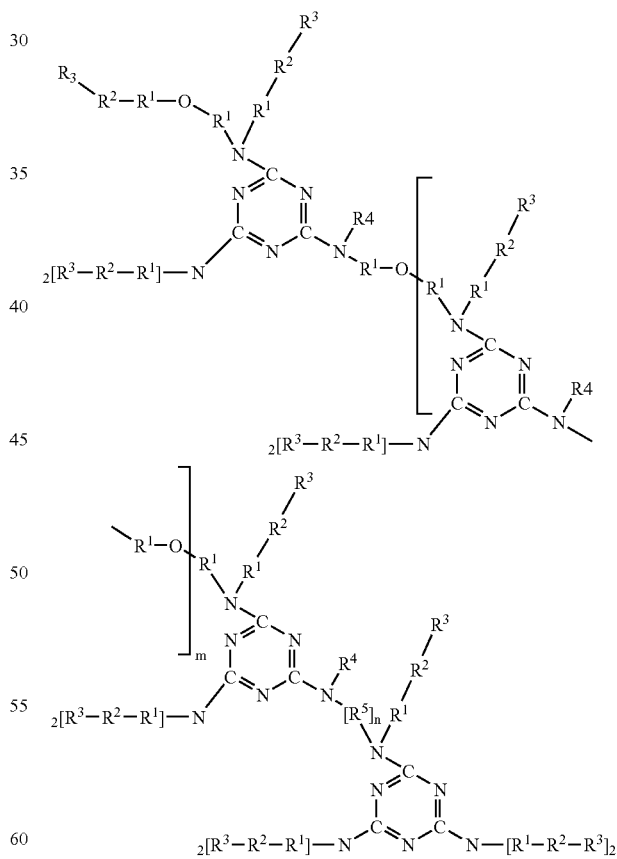

wherein m is an integer of 1 to 100;

$R^1$ is independently selected from the group consisting of alkyl groups having one to twenty carbon atoms;

$R^2$ is independently selected from the group consisting of an oxygen atom and a sulfur atom;

$R^3$ is independently selected from the group consisting of an alkyl group, an allyl group, an alkynyl group, an aryl group, and a phenyl group, having one to seventy carbon atoms;

$R^4$ is independently selected from the group consisting of —$C_pH_{2p}OH$; —$C_pH_{2p-1}OH$; —$C_pH_{2p-2}OH$, wherein p is an integer of one to seven; a hydrogen atom; a carboxyl group, an alkyl group; an allyl group; and an alkynyl group;

$R^5$ is independently selected from the group consisting of an alkyl group, an alkyl group containing at least one ether linkage, and the group represented by the formula (III):

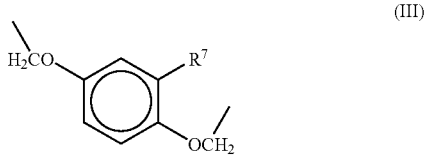

(III)

wherein $R^7$ is independently a $C_{10}$-$C_{40}$ branched or unbranched, substituted or unsubstituted alkyl, allyl, or alkynyl group, and;

n is an integer of one to thirty;

wherein the melamine ring-containing co-polymer is the reaction product of at least one melamine base resin and at least one reactant compound, wherein the at least one reactant compound comprises a cashew nut shell liquid and has at least one functional group selected from a carboxyl group, a hydroxyl group, a thiol group and combinations thereof.

2. The co-polymer of claim 1, wherein the cashew nut shell liquid comprises cardanol and cardol.

3. The co-polymer of claim 1, wherein the at least one reactant compound further comprises a fatty acid.

4. The co-polymer of claim 3, wherein the fatty acid is selected from the group consisting of lauric acid, myristic acid, palmitic acid, stearic acid, arachidic acid, palmitoleic acid, oleic acid, ricinoleic acid, linoleic acid, arachidonic acid, and combinations thereof.

5. The co-polymer of claim 1, wherein the at least one reactant compound further comprises at least one compound which is selected from the group consisting of dodecyl mercaptan, phenyl mercaptan, lauryl thioglycolate, octyl thioglycolate, and mixtures thereof.

6. The co-polymer of claim 1, wherein the at least one melamine base resin is modified or unmodified and is selected from the group consisting of a melamine resin, a melamine-formaldehyde resin, a melamine-urea-formaldehyde resin, methylated melamine formaldehyde, and combinations thereof.

7. A melamine ring-containing co-polymer of formula (I):

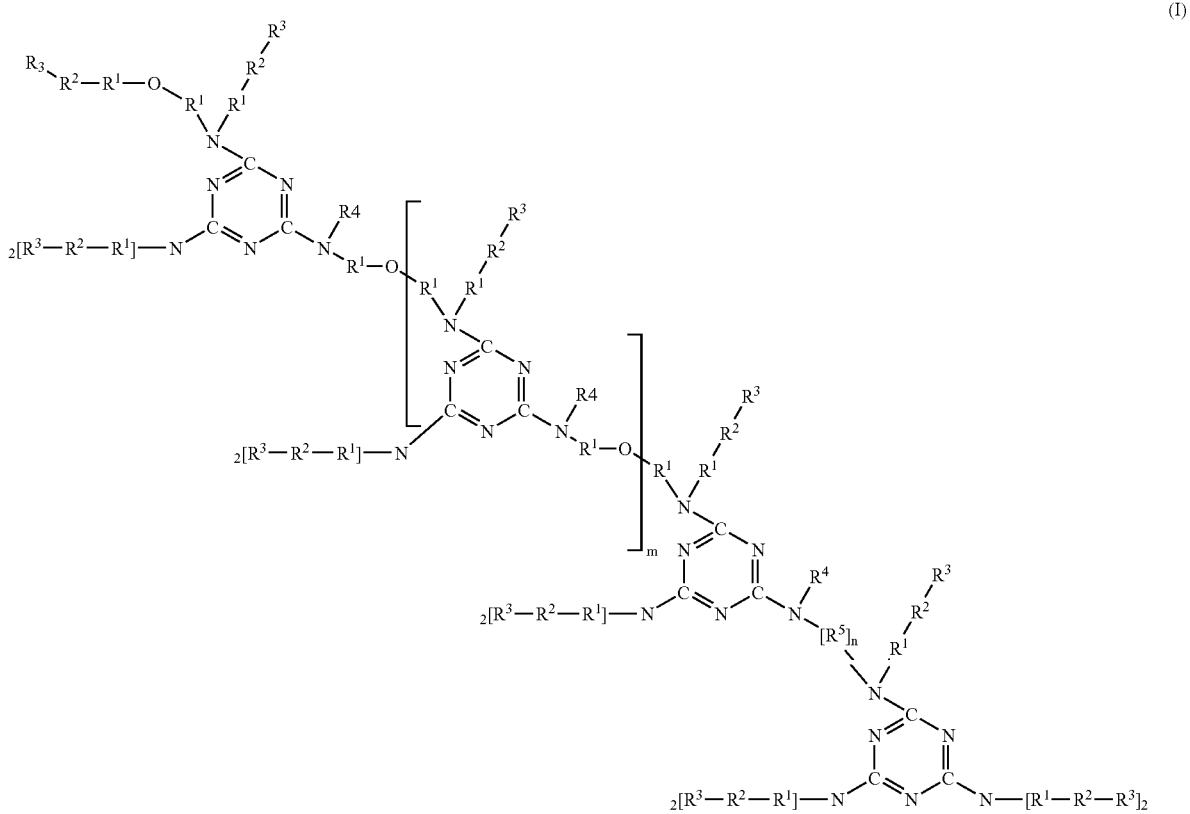

(I)

wherein m is an integer of 1 to 100;

$R^1$ is independently selected from the group consisting of alkyl groups having one to twenty carbon atoms;

$R^2$ is independently selected from the group consisting of an oxygen atom and a sulfur atom;

R³ is independently selected from the group consisting of an alkyl group, an allyl group, an alkynyl group, an aryl group, and a phenyl group, having one to seventy carbon atoms;

R⁴ is independently selected from the group consisting of —$C_pH_{2p}OH$; —$C_pH_{2p-1}OH$; —$C_pH_{2p-2}OH$, wherein p is an integer of one to seven; a hydrogen atom; a carboxyl group, an alkyl group; an allyl group; and an alkynyl group;

R⁵ is independently selected from the group consisting of an alkyl group, an alkyl group containing at least one ether linkage, and the group represented by the formula (III):

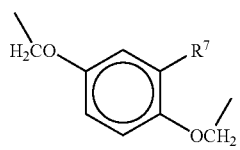

(III)

wherein R⁷ is independently a $C_{10}$-$C_{40}$ branched or unbranched, substituted or unsubstituted alkyl, allyl, or alkynyl groups and;

n is an integer of one to thirty.

8. The co-polymer of claim 7, wherein R¹ is independently selected from the group consisting of an alkyl group having two to seven carbon atoms.

9. The co-polymer of claim 7, wherein at least one of R³ is independently selected from the group consisting of an alkyl group, an allyl group, an alkynyl group, an aryl group, and a phenyl group having thirty to sixty carbon atoms.

10. The co-polymer of claim 7, wherein at least one of R³ is independently selected from the group consisting of an alkyl group, an allyl group, an alkynyl group, an aryl group, and a phenyl group having six to twelve carbon atoms.

11. The co-polymer of claim 7, wherein at least one R³ is a structure represented by the formula (II):

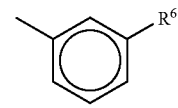

(II)

wherein R⁶ is independently selected from the group consisting of an alkyl group, an allyl group, and an alkynyl group having ten to forty carbon atoms.

12. The co-polymer of claim 11, wherein R⁶ is independently selected from the group consisting of an alkyl group, an allyl group, and an alkynyl group having fifteen to thirty carbon atoms.

13. The co-polymer of claim 11, wherein R⁶ is independently selected from the group consisting of —$(CH_2)_7$CH=CH—$(CH_2)_5$CH₃; —$(CH_2)_7$CH=CHCH₂CH=CH$(CH_2)_2$CH₃; —$(CH_2)_7$CH=CHCH₂CH=CHCH₂CH=CH₂; and —$(CH_2)_{14}$CH₃.

14. A method of preparing a melamine ring-containing co-polymer comprising:

reacting at least one melamine base resin with at least one reactant compound;

wherein the reactant compound comprises cashew nut shell liquid and has at least one functional group selected from a carboxyl group, a hydroxyl group, a thiol group and combinations thereof, wherein the copolymer has formula (I):

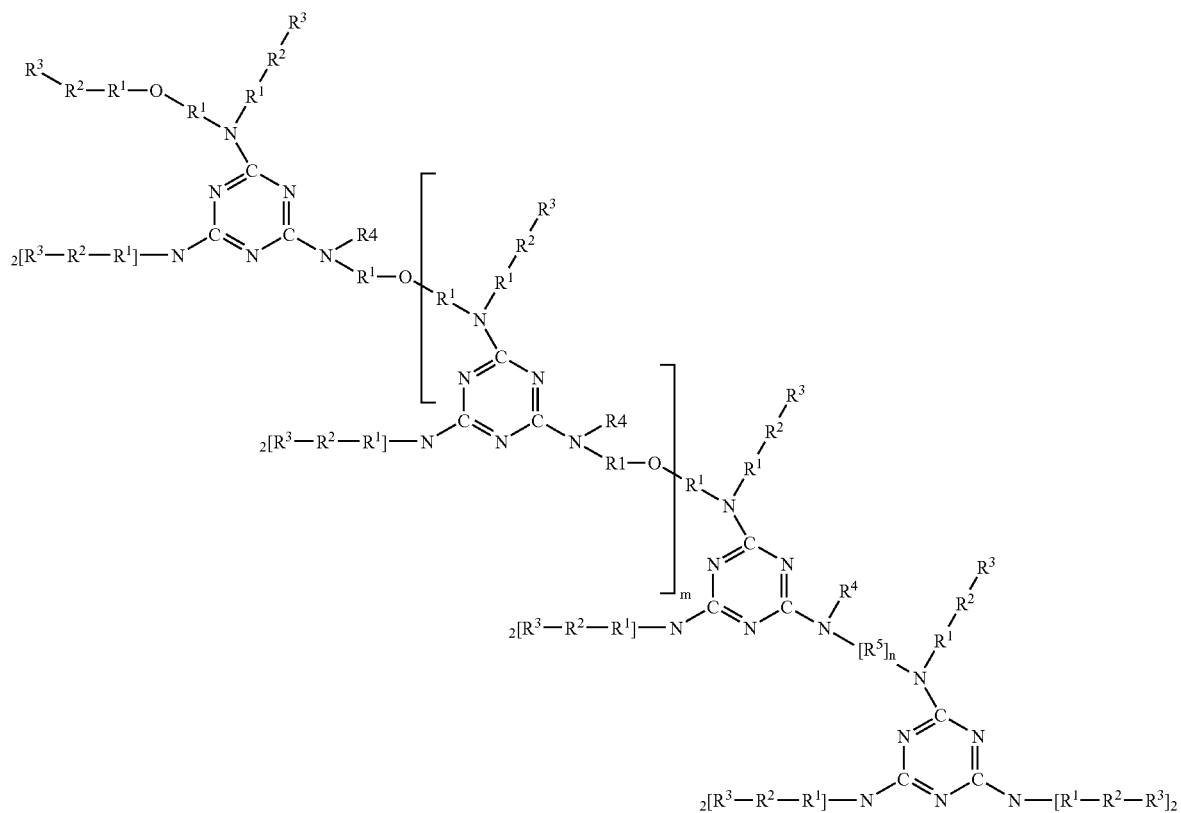

(I)

wherein m is an integer of 1 to 100;

$R^1$ is independently selected from the group consisting of alkyl groups having one to twenty carbon atoms;

$R^2$ is independently selected from the group consisting of an oxygen atom and a sulfur atom;

$R^3$ is independently selected from the group consisting of an alkyl group, an allyl group, an alkynyl group, an aryl group, and a phenyl group, having one to seventy carbon atoms;

$R^4$ is independently selected from the group consisting of —$C_pH_{2p}OH$; —$C_pH_{2p-1}OH$; —$C_pH_{2p-2}OH$, wherein p is an integer of one to seven; a hydrogen atom; a carboxyl group; an alkyl group; an allyl group; and an alkynyl group;

$R^5$ is independently selected from the group consisting of an alkyl group, an alkyl group containing at least one ether linkage, and the group represented by the formula (III):

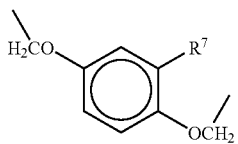
(III)

wherein $R^7$ is independently a $C_{10}$-$C_{40}$ branched or unbranched, substituted or unsubstituted alkyl, allyl, or alkynyl group, and;

n is an integer of one to thirty.

15. The method of claim 14, wherein the reaction is carried out in the presence of a proton-donating catalyst.

16. The method of claim 15, wherein the catalyst is a sulfo radical containing catalyst.

17. The method of claim 15, wherein the catalyst is selected from the group consisting of methanesulfonic acid, phosphoric acid, nitric acid, oxalic acid, maleic acid, hexamic acid, phthalic acid, acrylic acid, para-toluene sulfonic acid, dinonyl naphthalene sulfonic acid, magnesium bromide, zinc nitrate, aluminum nitrate, magnesium nitrate, and combinations thereof.

18. The method of claim 14, wherein the at least one reactant compound comprises cardol and cardanol.

19. The method of claim 14, wherein the at least one reactant compound comprises a fatty acid.

20. The method of claim 19, wherein the fatty acid is selected from the group consisting of lauric acid, myristic acid, palmitic acid, stearic acid, arachidic acid, palmitoleic acid, oleic acid, ricinoleic acid, linoleic acid, arachidonic acid, and combinations thereof.

21. The method of claim 14, wherein the at least one base melamine base resin is modified or unmodified and is selected from the group consisting of a melamine resin, a melamine-formaldehyde resin, a melamine-urea-formaldehyde resin, methylated melamine formaldehyde, and combinations thereof.

22. A surface having a coating, wherein the coating comprises a melamine ring-containing co-polymer having the structure of formula (I):

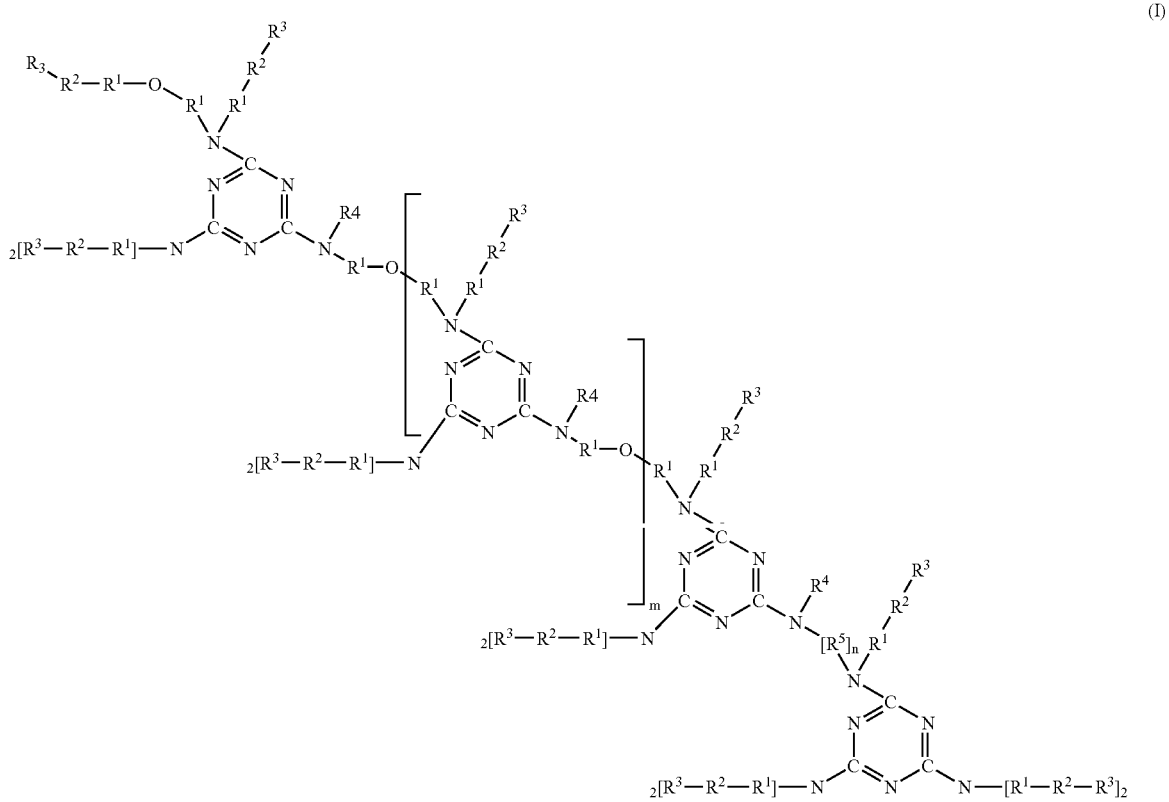
(I)

wherein m is an integer of 1 to 100;

$R^1$ is independently selected from the group consisting of an alkyl groups having one to twenty carbon atoms;

$R^2$ is independently selected from the group consisting of an oxygen atom and a sulfur atom;

$R^3$ is independently selected from the group consisting of an alkyl group, an allyl group, an alkynyl group, an aryl group, and a phenyl group, having one to seventy carbon atoms;

$R^4$ is independently selected from the group consisting of —$C_pH_{2p}OH$; —$C_pH_{2p-1}OH$; —$C_pH_{2p-2}OH$, wherein p is an integer of one to seven; a hydrogen atom; a carboxyl group; an alkyl group; an allyl group; and an alkynyl group;

$R^5$ is independently selected from the group consisting of an alkyl group, an alkyl group containing at least one ether linkage, and the group represented by the formula (III):

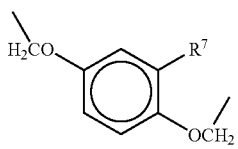

(III)

wherein $R^7$ is independently a $C_{10}$-$C_{40}$ branched or unbranched, substituted or unsubstituted alkyl, allyl, or alkynyl group, and;

n is an integer of one to thirty.

23. A melamine ring containing co-polymer that is a reaction product of a cashew nut shell liquid and at least one melamine-formaldehyde resin wherein the cashew nutshell liquid comprises cardanol and cardol, and wherein the cardanol is present in an amount ranging from about 80% to about 100% by weight of the cashew nut shell liquid and the cardol is present in an amount ranging from about 1% to about 20% by weight of the cashew nut shell liquid.

24. The melamine ring containing co-polymer of claim 23, wherein the reaction is carried out in the presence of a proton-donating catalyst.

25. The melamine ring containing co-polymer of claim 23, wherein the at least one melamine resin comprises a methylated melamine formaldehyde resin.

26. The method of claim 23, wherein the cashew nutshell liquid is in the form of a cashew nut shell liquid distillate.

27. The copolymer of claim 1, wherein the at least one melamine base resin is a methylated melamine formaldehyde resin.

28. The melamine ring containing co-polymer of claim 1, wherein the cashew nutshell liquid comprises cardanol and cardol, and wherein the cardanol is present in an amount ranging from about 80% to about 100% by weight of the cashew nut shell liquid and the cardol is present in an amount ranging from about 1% to about 20% by weight of the cashew nut shell liquid.

29. The melamine ring containing co-polymer of claim 28 that is a reaction product of a cashew nut shell liquid and at least one melamine-formaldehyde resin, wherein the cashew nutshell liquid comprises cardanol and cardol, and wherein the cardanol is present in an amount ranging from about 96% to about 98% by weight of the cashew nut shell liquid and the cardol is present in an amount ranging from about 2% to about 4% by weight of the cashew nut shell liquid.

30. The co-polymer of claim 23, wherein the cardanol is present in an amount ranging from about 96% to about 98% by weight of the cashew nut shell liquid and the cardol is present in an amount ranging from about 2% to about 4% by weight of the cashew nut shell liquid.

* * * * *